United States Patent
Wang et al.

(10) Patent No.: US 11,372,967 B2
(45) Date of Patent: Jun. 28, 2022

(54) DETECTION METHOD OF CONTROL FLOW ATTACKS BASED ON RETURN ADDRESS SIGNATURES

(71) Applicant: Wenzhou University, Zhejiang (CN)

(72) Inventors: Pengjun Wang, Zhejiang (CN); Yunfei Yu, Zhejiang (CN); Jiana Lian, Zhejiang (CN); Gang Li, Zhejiang (CN); Bo Chen, Zhejiang (CN); Yuejun Zhang, Zhejiang (CN)

(73) Assignee: Wenzhou University, Zhejiang (CN)

( * ) Notice: Subject to any disclaimer, the term of this patent is extended or adjusted under 35 U.S.C. 154(b) by 108 days.

(21) Appl. No.: 17/086,482

(22) Filed: Nov. 2, 2020

(65) Prior Publication Data
US 2021/0133314 A1    May 6, 2021

(30) Foreign Application Priority Data
Nov. 6, 2019 (CN) .......................... 201911079317.8

(51) Int. Cl.
*G06F 21/52* (2013.01)
*G06F 7/58* (2006.01)
(Continued)

(52) U.S. Cl.
CPC .............. *G06F 21/52* (2013.01); *G06F 7/582* (2013.01); *G06F 9/30029* (2013.01);
(Continued)

(58) Field of Classification Search
CPC ...... G06F 21/52; G06F 7/582; G06F 9/30029; G06F 9/30101; G06F 9/3806;
(Continued)

(56) References Cited

U.S. PATENT DOCUMENTS 9,646,154 B2 * 5/2017 Chen .................... G06F 12/1408
2004/0220975 A1 * 11/2004 Carpentier ............... G06F 21/64
(Continued)

OTHER PUBLICATIONS

Kayaalp et al., SCRAP: Architecture for Signature-Based Protection from Code Reuse Attacks, 2013, IEEE (Year: 2013).*
(Continued)

*Primary Examiner* — Corey S Faherty
(74) *Attorney, Agent, or Firm* — JCIP Global Inc.

(57) ABSTRACT

A control flow attacks based on return address signatures comprises: using a return address as a push return address when a response is given to an interrupt service routine; generating an encrypted push return address by an XOR encryption circuit by means of an n-bit binary key generated by a pseudo random number generator; then, generating a push_address signature value by an MD algorithm signature circuit; when the response to the interrupt service routine is over, reading an n-bit binary address out of a stack to serve as a pop return address; generating an encrypted pop return address by the XOR encryption circuit; generating a pop address signature value by the MD algorithm signature circuit; comparing the push_address signature value with the pop address signature value; and determining whether or not a data processor is under a control flow attack according to a comparison result.

4 Claims, 4 Drawing Sheets

(51) Int. Cl.
*G06F 9/30* (2018.01)
*G06F 9/38* (2018.01)
*G06F 9/48* (2006.01)
*G06F 21/60* (2013.01)
*H04L 9/06* (2006.01)
*H04L 9/32* (2006.01)
*G06F 21/54* (2013.01)

(52) U.S. Cl.
CPC ........ *G06F 9/30101* (2013.01); *G06F 9/3806* (2013.01); *G06F 9/4812* (2013.01); *G06F 21/602* (2013.01); *H04L 9/0643* (2013.01); *H04L 9/3239* (2013.01); *G06F 21/54* (2013.01)

(58) Field of Classification Search
CPC ...... G06F 9/4812; G06F 21/602; G06F 7/584; G06F 21/54; G06F 21/57; H04L 9/0643; H04L 9/3239; H04L 63/1466
See application file for complete search history.

(56) References Cited

U.S. PATENT DOCUMENTS

| | | | |
|---|---|---|---|
| 2009/0144309 A1* | 6/2009 | Cabrera Escandell | G06F 21/54 707/999.102 |
| 2011/0154059 A1* | 6/2011 | Durham | G06F 21/79 711/163 |
| 2014/0173290 A1* | 6/2014 | Kaplan | G06F 21/72 713/189 |
| 2016/0171211 A1* | 6/2016 | Chen | G06F 21/54 726/23 |

OTHER PUBLICATIONS

Jia et al., Defending return-oriented programming based on virtualization techniques, 2013 (Year: 2013).*
Davi et al., ROPdefender: A Detection Tool to Defend Against Return-Oriented Programming Attacks, 2011 (Year: 2011).*

* cited by examiner

DETECTION METHOD OF CONTROL FLOW ATTACKS BASED ON RETURN ADDRESS SIGNATURES

CROSS-REFERENCE TO RELATED APPLICATION

This application claims the priority benefit of China application serial no. 201911079317.8, filed on Nov. 6, 2019. The entirety of the above-mentioned patent application is hereby incorporated by reference herein and made a part of this specification.

TECHNICAL FIELD

The invention relates to a detection method of control flow attacks, in particular to a detection method of control flow attacks based on return address signatures.

DESCRIPTION OF RELATED ART

The rapid development of the technologies such as Internet of Things, cloud computing and mobile payment leads to wide application of data processors (embedded systems) in military, automotive, medical and communication fields. The communication and collaboration between different data processors by network bring an opportunity for attackers to launch control flow attacks by means of software bugs to further have the entire data processors under their control. The attackers conduct control flow attacks by tampering memory addresses of program control flows or controlling stream data by means of program bugs to redirect a program and execute preset malicious codes to destroy the data processors or steal key information. The control flow attacks include code injection attacks and code reuse attacks, depending on whether malicious codes are injected. The attackers launch the code injection attacks by injecting the malicious codes in programs by means of some software bugs, and stack overflow attacks are typical ones of code injection attacks. When the quantity of data written into stacks of the data processors exceeds the capacity of the stacks, data will overflow and cover legal data, and the lack of boundary check on an original program may lay a danger of an overflow attack from an attacker. The attacker may hijack a control flow by covering an original return address with an overflow attack and altering the return address into an address pre-injected with malicious codes.

At present, when a data processor gives a response to an interrupt service routine (executes a routine call instruction call), an address of an instruction executed before the data processor gives a response to the interrupt service routine is written into a stack of the data processor by a Push function, and the address written into the stack is referred to as a return address (n-bit binary number, n is greater than or equal to 1). When the response to the interrupt service routine is over, the data processor executes a routine return instruction ret and reads the return address out of the stack by means of a Pop function to continue to execute the instruction at the return address before interruption.

Due to the fact that the stack of the data processor is a continuously-allocated finite memory space, every time one interrupt service routine is called, a return address will be written into the stack; when data written into an allocated memory of the stack exceeds the data capacity of the memory, overflow of stack data will be caused, and if overflow data is written into the stack, original data in the stack will be covered. When launching an attack to the data processor, the attacker will write excessive data into the stack, after the return address has been written into the stack, to enable data originally written into the stack to overflow to alter the original return address in the stack into an address leading to malicious codes or having a malicious code instruction stored thereat to hijack a control flow, at this moment, if the data processor executes the routine return instruction ret, the address leading to the malicious codes or having the malicious code instruction stored thereat rather than the original return address will be read out of the stack by means of the Pop function, and consequentially, the behaviors of the entire data processor will be under the control of the attacker. Hence, all existing data processors cannot defend against control flow attacks, thus being low in security.

BRIEF SUMMARY OF THE INVENTION

The technical issue to be settled by the invention is to provide a detection method of control flow attacks based on return address signatures, which can defend data processors against control flow attacks and improve the security of the data processors.

The technical solution adopted by the invention to settle the aforesaid technical issue is as follows: a detection method of control flow attacks based on return address signatures comprises the following steps:

① Configuring, in a data processor, a pseudo random number generator for generating an n-bit binary key, an XOR encryption circuit for encrypting a return address, a MD5 algorithm signature circuit for generating a push return address signature value and a pop return address signature value, a signature comparator for determining whether or not the push return address signature value is identical with the pop return address signature value, a push return address register for storing a push return address, a pop return address register for storing a pop return address, a key register for storing the n-bit binary key, a push signature register for storing a push address signature value, and a pop signature register for storing a pop address signature value;

② When the data processor executes a routine call instruction call in response to an interrupt service routine, writing, by a Push function, an n-bit binary address of an instruction executed before the data processor responds to the interrupt service routine, into a stack of the data processor to serve as the return address, at the same time, storing, by the Push function, the n-bit binary address of the instruction executed before the data processor responds to the interrupt service routine, in the push return address register to serve as the push return address, marking the push return address as push_addr[n−1:0], generating the n-bit binary key by the pseudo random number generator, marking the n-bit binary key as K, and storing the n-bit binary key in the key register;

③ Performing, by the XOR encryption circuit, a bitwise XOR operation on the push return address push_addr[n−1:0] and the n-bit binary key K to generate an encrypted push return address, and marking the encrypted push return address as xor_push_addr;

④ Generating, by the MD5 algorithm signature circuit, the push address signature value by using the encrypted push return address xor_push_addr as an input of the MD5 algorithm signature circuit, marking the push address signature value as push_signature, and storing the push address signature value push_signature in the push signature register;

⑤ When the response of the data processor to the interrupt service routine is over, executing a routine return instruction ret, reading the n-bit binary address out of the stack of the data processor by a Pop function, storing the read-out n-bit binary address in the pop return address register to serve as the pop return address, and marking the pop return address as pop_addr[n−1:0];

⑥ Performing, by the XOR encryption circuit, a bitwise XOR operation on the pop return address pop_addr[n−1:0] and the n-bit binary key K to generate an encrypted pop return address, and marking the encrypted pop return address as xor_pop_addr;

⑦ Generating, by the MD5 algorithm signature circuit, the pop address signature value by using the encrypted pop return address xor_pop_addr as an input of the MD5 algorithm signature circuit, marking the pop address signature value as pop_signature, and storing the pop address signature value pop_signature in the pop signature register; and ⑧ Inputting the push address signature value push_signature and the pop address signature value pop_signature to the signature comparator to be compared; if the push address signature value push_signature is identical with the pop address signature value pop_signature, outputting 1 by the signature comparator, and continuing to execute the routine by the data processor; or if the push address signature value push_signature is not identical with the pop address signature value pop_signature, outputting 0 by the signature comparator, and resetting the data processor.

The pseudo random number generator comprises n D flip-flops and n−1 two-input XOR gates, wherein each D flip-flop has an input terminal, a clock terminal and an output terminal, and each two-input XOR gate has a first input terminal, a second input terminal and an output terminal; the clock terminals of the n D flip-flops are connected at a clock terminal of the pseudo random number generator, and a clock signal is provided to the clock terminal of the pseudo random number generator; the output terminal of the $m^{th}$ D flip-flop is connected to the second input terminal of the $m^{th}$ two-input XOR gate, and the output terminal of the $m^{th}$ two-input XOR gate is connected to the input terminal of the $(m+1)^{th}$ D flip-flop, wherein m=1, 2, . . . , n−1; first-bit data of an n-bit binary random number is provided to the input terminal of the first D flip-flop, and $j^{th}$-bit data of the n-bit binary random number is provided to the first input terminal of the $(j−1)^{th}$ two-input XOR gate, wherein j=2, 3, . . . , n; the output terminal of the $n^{th}$ D flip-flop outputs the n-bit key K; and the n-bit binary random number is generated by a random function.

The XOR encryption circuit comprises n two-input XOR gates, wherein each two-input XOR gate has two input terminals and an output terminal. When the bitwise XOR operation is performed on the push return address push_addr[n−1:0] and the n-bit binary key K by the XOR encryption circuit, $h^{th}$-bit data of push_addr[n−1:0] and $h^{th}$-bit data of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data of the primarily-encrypted pop return address xor_pop_addr. When the bitwise XOR operation is performed on the n-bit return address pop_addr[n−1:0] and the n-bit binary key K by the XOR encryption circuit, $h^{th}$-bit data of the n-bit return address pop_addr[n−1:0] and $h^{th}$-bit data of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data of the secondarily-encrypted pop return address xor_pop_addr, wherein h=1, 2, . . . n.

Each two-input XOR gate in the XOR encryption circuit comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein an operation voltage (power supply) VDD is provided to a source of the first PMOS transistor, a source of the second PMOS transistor, a source of the third PMOS transistor and a source of the fourth PMOS transistor; a gate of the first PMOS transistor, a gate of the first NMOS transistor, a gate of the third PMOS transistor and a gate of the third NMOS transistor are connected at a first input terminal of the two-input XOR gate; a drain of the first PMOS transistor, a drain of the first NMOS transistor, the gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth NMOS transistor and a gate of the fifth NMOS transistor are connected at a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected at the output terminal of the two-input XOR gate; a source of the first NMOS transistor, a source of the second NMOS transistor, a source of the fifth NMOS transistor and a source of the sixth NMOS transistor are grounded (i.e. provided with a ground voltage VSS); a source of the third NMOS transistor and a drain of the fifth NMOS transistor are connected; and a source of the fourth NMOS transistor and a drain of the sixth NMOS transistor are connected. In the two-input XOR gate, a first inverter is formed by the first PMOS transistor and the first NMOS transistor, a second inverter is formed by the second PMOS transistor and the second NMOS transistor, a pull-down network is formed by the third NMOS transistor, the fifth NMOS transistor, the fourth NMOS transistor and the sixth NMOS transistor, and a pull-up network is formed by the third PMOS transistor, the fifth PMOS transistor, the fourth PMOS transistor and the sixth PMOS transistor; two input signals input to the two-input XOR gate are referred to as signal A and signal B, wherein a first input signal is marked as A, a second input signal is marked as B; after signal A is input to the first inverter, a NOT signal A' of signal A is generated; after signal B is input to the second inverter, a NOT signal B' of signal B is generated; when signal A and signal B reach the gate of the third NMOS transistor and the gate of the fifth NMOS transistor, an AND operation is implemented on signal A and signal B to obtain an AND logic value AB; when signal A' and signal B' reach the gate of the fourth NMOS transistor and the gate of the sixth NMOS transistor, an AND operation is implemented on signal A' and signal B' to obtain an AND logic value A'B'; a first series circuit is formed by the third NMOS transistor and the fifth NMOS transistor, a second series circuit is formed by the fourth NMOS transistor and the sixth NMOS transistor, the first series circuit and the second series circuit are connected in parallel to implement an OR operation on AB and A'B' to obtain an OR logic value AB+A'B', which is then inverted to obtain a NOT logic value (AB+A'B')' of the OR logic value AB+A'B', and in this way, the XOR operation is implemented. The two-input XOR gate implements the XOR operation by means of a CMOS-based static complementary circuit structure formed by 12 MOS transistors, has a small static current, a simple circuit structure and small hardware overhead, so that large hardware overhead and high power consumption are avoided in the process of defending against control flow attacks.

Compared with the prior art, the invention has the following advantages: a pseudo random number generator for generating an n-bit binary key, an XOR encryption circuit for encrypting a return address, a MD5 algorithm signature circuit for generating a push return address signature value and a pop return address signature value, a signature comparator for determining whether or not the push return address signature value is identical with the pop return address signature value, a push return address register for storing a push return address, a pop return address register for storing a pop return address, a key register for storing the n-bit binary key, a push signature register for storing a push address signature value, and a pop signature register for storing a pop address signature value are configured in a data processor; when the data processor executes a routine call instruction call in response to an interrupt service routine, an n-bit binary address of an instruction executed before the data processor responds to the interrupt service routine is stored in the push return address register by a Push function to serve as the push return address, the n-bit binary key is generated by the pseudo random number generator is stored in the key register; then, a bitwise XOR operation is performed on the push return address and the n-bit binary key K by the XOR encryption circuit to generate an encrypted push return address; the push address signature value is generated by the MD5 algorithm signature circuit by using the encrypted push return address as an input of the MD5 algorithm signature circuit and is stored in the push signature register; when the response of the data processor to the interrupt service routine is over, a routine return instruction ret is executed, the n-bit binary address is read out of the stack of the data processor by a Pop function, and the read-out n-bit binary address is stored in the pop return address register to serve as the pop return address; a bitwise XOR operation is performed on the pop return address and the n-bit binary key K by the XOR encryption circuit to generate an encrypted pop return address; the pop address signature value is generated by the MD5 algorithm signature circuit by using the encrypted pop return address as an input of the MD5 algorithm signature circuit and is stored in the pop signature register; and finally, the push address signature value and the pop address signature value are input to the signature comparator to be compared; if the push address signature value is identical with the pop address signature value, the signature comparator outputs 1, and the data processor continues to execute the routine; or if the push address signature value is not identical with the pop address signature value, the signature comparator outputs 0, and the data processor resets. In this way, the method of the invention can monitor in real time whether or not the return address is altered by an attacker, thus defending against control flow attacks launched by the attacker and improving the security of the data process.

DETAILED DESCRIPTION OF THE INVENTION

The invention is further expounded below in conjunction with the accompanying drawings.

Figure 1:
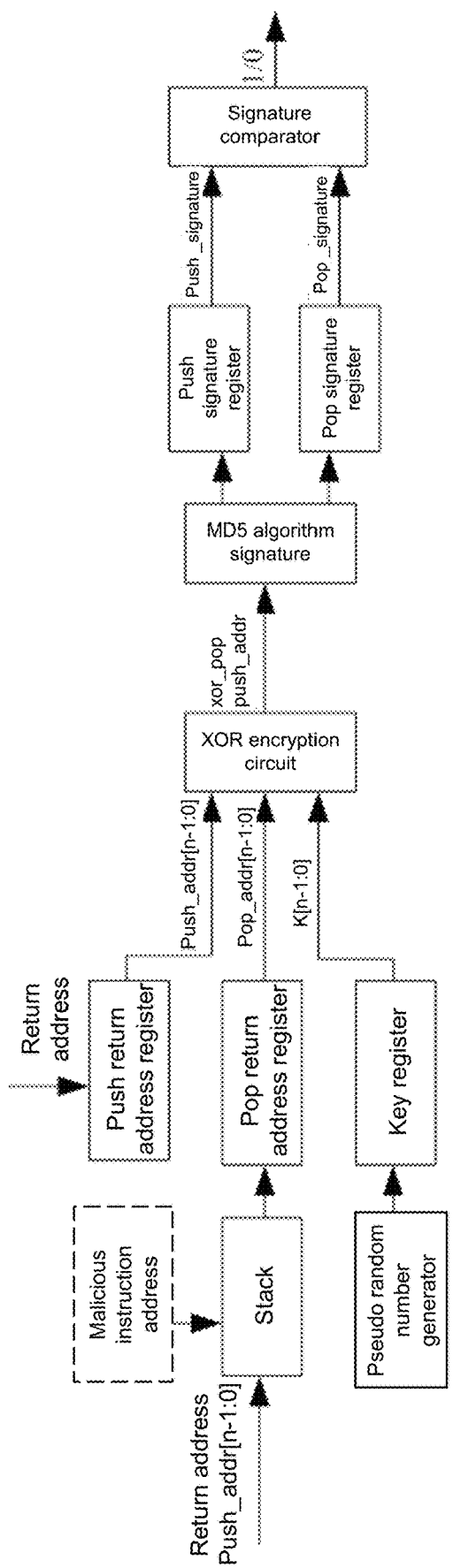
FIG. 1 is a hardware diagram of a detection method of control flow attacks based on return address signatures of the invention.

Embodiment: As shown in FIG. 1, a detection method of control flow attacks based on return address signatures comprises the following steps:

① A pseudo random number generator for generating an n-bit binary key, an XOR encryption circuit for encrypting a return address, a MD5 algorithm signature circuit for generating a push return address signature value and a pop return address signature value, a signature comparator for determining whether or not the push return address signature value is identical with the pop return address signature value, a push return address register for storing a push return address, a pop return address register for storing a pop return address, a key register for storing the n-bit binary key, a push signature register for storing a push address signature value, and a pop signature register for storing a pop address signature value are configured in a data processor;

② When the data processor executes a routine call instruction call in response to an interrupt service routine, an n-bit binary address of an instruction executed before the data processor responds to the interrupt service routine is written into a stack of the data processor by a Push function to serve as the return address, at the same time, the n-bit binary address of the instruction executed before the data processor responds to the interrupt service routine is stored in the push return address register by the Push function to serve as the push return address, the push return address is marked as push_addr[n−1:0], the n-bit binary key is generated by the pseudo random number generator, the n-bit binary key is marked as K, and the n-bit binary key is stored in the key register;

③ A bitwise XOR operation is performed on the push return address push_addr[n−1:0] and the n-bit binary key K by the XOR encryption circuit to generate an encrypted push return address, and the encrypted push return address is marked as xor_push_addr;

④ The push address signature value is generated by the MD5 algorithm signature circuit by using the encrypted push return address xor_push_addr as an input of the MD5 algorithm signature circuit, the push address signature value is marked as push_signature, and the push address signature value push_signature is stored in the push signature register;

⑤ When the response of the data processor to the interrupt service routine is over, a routine return instruction ret is executed, the n-bit binary address is read out of the stack of the data processor by a Pop function, the read-out n-bit binary address is stored in the pop return address register to serve as the pop return address, and the pop return address is marked as pop_addr[n−1:0];

⑥ A bitwise XOR operation is performed on the pop return address pop_addr[n−1:0] and the n-bit binary key K by the XOR encryption circuit to generate an encrypted pop return address, and the encrypted pop return address is marked as xor_pop_addr;

⑦ The pop address signature value is generated by the MD5 algorithm signature circuit by using the encrypted pop return address xor_pop_addr as an input of the MD5 algorithm signature circuit, the pop address signature value is marked as pop_signature, and the pop address signature value pop_signature is stored in the pop signature register; and ⑧ The push address signature value push_signature and the pop address signature value pop_signature are input to the signature comparator to be compared; if the push address signature value push_signature is identical with the pop address signature value pop_signature, the signature comparator outputs 1, and the data processor continues to execute the routine; or if the push address signature value push_signature is not identical with the pop address signature value pop_signature, the signature comparator outputs 0, and the data processor resets.

Figure 2:
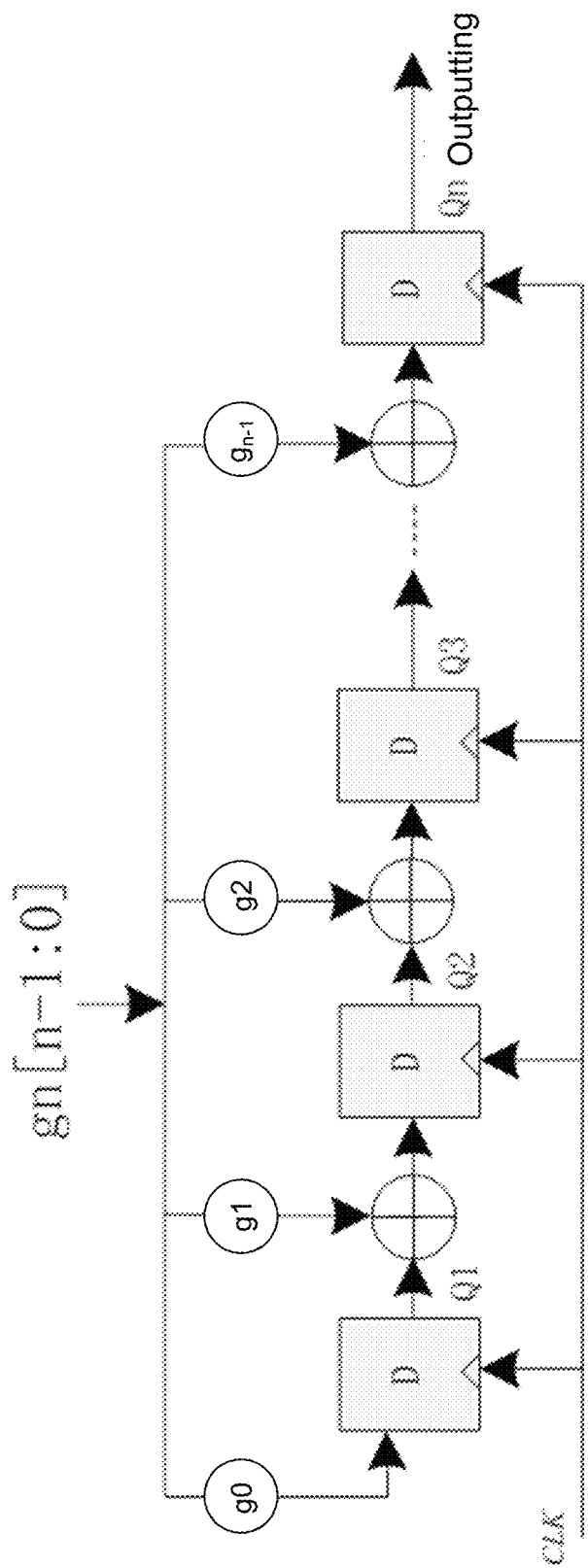
FIG. 2 is a structural diagram of a pseudo random number generator for the detection method of control flow attacks based on return address signatures of the invention.

As shown in FIG. 2, in this embodiment, the pseudo random number generator comprises n D flip-flops, Q1-Qn and n−1 two-input XOR gates, wherein each D flip-flop has an input terminal, a clock terminal and an output terminal, and each two-input XOR gate has a first input terminal, a second input terminal and an output terminal; the clock terminals of the n D flip-flops are connected at a clock terminal of the pseudo random number generator, and a clock signal CLK is provided to the clock terminal of the pseudo random number generator; the output terminal of the $m^{th}$ D flip-flop is connected to the second input terminal of the $m^{th}$ two-input XOR gate, and the output terminal of the $m^{th}$ two-input XOR gate is connected to the input terminal of the $(m+1)^{th}$ D flip-flop, wherein m=1, 2, . . . , n−1; first-bit data g0 of an n-bit binary random number gn[n−1:0] is provided to the input terminal of the first D flip-flop, and $j^{th}$-bit data gj of the n-bit binary random number gn[n−1:0] is provided to the first input terminal of the $(j−1)^{th}$ two-input XOR gate, wherein j=2, 3, . . . , n; the output terminal of the $n^{th}$ D flip-flop outputs the n-bit key K; and the n-bit binary random number is generated by a random function.

Figure 3:
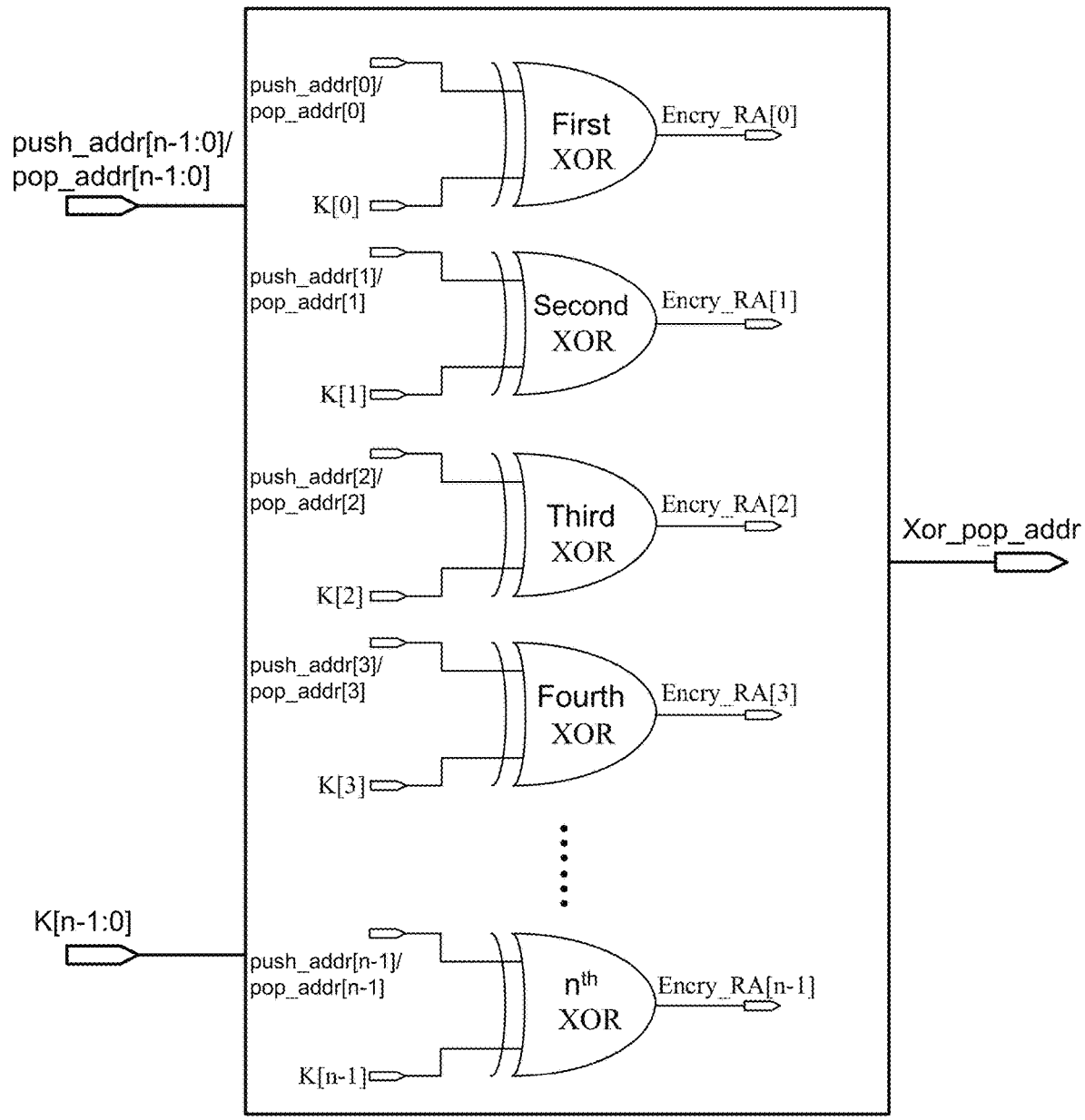
FIG. 3 is a structural diagram of an XOR encryption circuit for the detection method of control flow attacks based on return address signatures of the invention.

As shown in FIG. 3, in this embodiment, the XOR encryption circuit comprises n two-input XOR gates, wherein each two-input XOR gate has two input terminals and an output terminal. When the bitwise XOR operation is performed on the push return address push_addr[n−1:0] and the n-bit binary key K by the XOR encryption circuit, $h^{th}$-bit data push_addr[h] of push_addr[n−1:0] and $h^{th}$-bit data K[h] of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data Encry_RA[h] of the primarily-encrypted pop return address xor_pop_addr. When the bitwise XOR operation is performed on the n-bit return address pop_addr[n−1:0] and the n-bit binary key K by the XOR encryption circuit, $h^{th}$-bit data of the n-bit return address pop_addr[n−1:0] and $h^{th}$-bit data of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data Encry_RA[h] of the secondarily-encrypted pop return address xor_pop_addr, wherein h=1, 2, . . . n.

Figure 4:
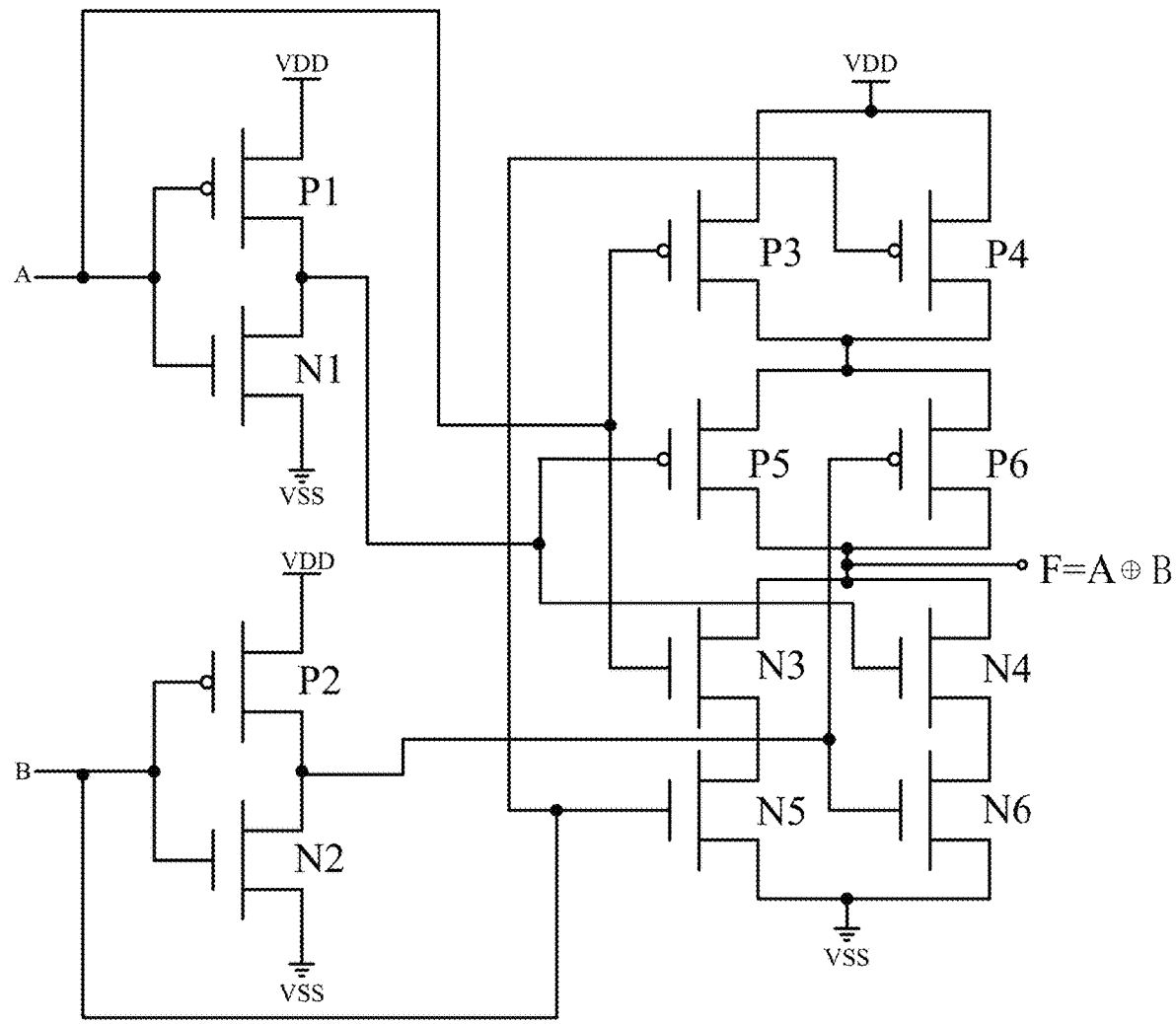
FIG. 4 is a circuit diagram of a two-input XOR gate in the XOR encryption circuit for the detection method of control flow attacks based on return address signatures of the invention.

As shown in FIG. 4, in this embodiment, each two-input XOR gate in the XOR encryption circuit comprises a first PMOS transistor P1, a second PMOS transistor P2, a third PMOS transistor P3, a fourth PMOS transistor P4, a fifth PMOS transistor P5, a sixth PMOS transistor P6, a first NMOS transistor N1, a second NMOS transistor N2, a third NMOS transistor N3, a fourth NMOS transistor N3, a fifth NMOS transistor N5 and a sixth NMOS transistor N6, wherein an operation voltage (power supply) VDD is provided to a source of the first PMOS transistor P1, a source of the second PMOS transistor P2, a source of the third PMOS transistor P3 and a source of the fourth PMOS transistor P4; a gate of the first PMOS transistor P1, a gate of the first NMOS transistor N1, a gate of the third PMOS transistor P3 and a gate of the third NMOS transistor N3 are connected at a first input terminal of the two-input XOR gate; a drain of the first PMOS transistor P1, a drain of the first NMOS transistor N1, the gate of the fifth PMOS transistor P5 and a gate of the fourth NMOS transistor N4 are connected; a drain of the second PMOS transistor P2, a drain of the second NMOS transistor N2, a gate of the sixth PMOS transistor P6 and a gate of the sixth NMOS transistor N6 are connected; a gate of the second PMOS transistor P2, a gate of the second NMOS transistor N2, a gate of the fourth NMOS transistor P4 and a gate of the fifth NMOS transistor N5 are connected at a second input terminal of the two-input XOR gate; a drain of the third PMOS transistor P3, a drain of the fourth PMOS transistor P4, a source of the fifth PMOS transistor P5 and a source of the sixth PMOS transistor P6 are connected; a drain of the fifth PMOS transistor P5, a drain of the sixth PMOS transistor P6, a drain of the third NMOS transistor N3 and a drain of the fourth NMOS transistor N4 are connected at the output terminal of the two-input XOR gate; a source of the first NMOS transistor N1, a source of the second NMOS transistor N2, a source of the fifth NMOS transistor N5 and a source of the sixth NMOS transistor N6 are grounded (i.e. provided with a ground voltage VSS); a source of the third NMOS transistor N3 and a drain of the fifth NMOS transistor N5 are connected; and a source of the fourth NMOS transistor N4 and a drain of the sixth NMOS transistor N6 are connected.

The method has the advantage of being able to monitor in real time whether or not the return address is altered by an attacker, thus defending against control flow attacks launched by the attacker and improving the security of the data process.

What is claimed is:

1. A detection method of control flow attacks based on return address signatures, wherein the detection method comprises the following steps:

① configuring, in a data processor, a pseudo random number generator for generating an n-bit binary key, an XOR encryption circuit for encrypting a return address, an MD5 algorithm signature circuit for generating a push return address signature value and a pop return address signature value, a signature comparator for determining whether or not the push return address signature value is identical with the pop return address signature value, a push return address register for storing a push return address, a pop return address register for storing a pop return address, a key register for storing the n-bit binary key, a push signature register for storing a push address signature value, and a pop signature register for storing a pop address signature value;

② when the data processor executes a routine call instruction call in response to an interrupt service routine, writing, by a Push function, an n-bit binary address of an instruction executed before the data processor responds to the interrupt service routine, into a stack of the data processor to serve as the return address, at the same time, storing, by the Push function, the n-bit binary address of the instruction executed before the data processor responds to the interrupt service routine, in the push return address register to serve as the push return address, marking the push return address as push_addr[n−1:0], generating the n-bit binary key by the pseudo random number generator, marking the n-bit binary key as K, and storing the n-bit binary key in the key register;

③ performing, by the XOR encryption circuit, a bitwise XOR operation on the push return address push_addr[n−1:0] and the n-bit binary key K to generate an encrypted push return address, and marking the encrypted push return address as xor_push_addr;

④ generating, by the MD5 algorithm signature circuit, the push address signature value by using the encrypted push return address xor_push_addr as an input of the MD5 algorithm signature circuit, marking the push address signature value as push_signature, and storing the push address signature value push_signature in the push signature register;

⑤ when the response of the data processor to the interrupt service routine is over, executing a routine return instruction ret, reading the n-bit binary address out of the stack of the data processor by a Pop function, storing the read-out n-bit binary address in the pop return address register to serve as the pop return address, and marking the pop return address as pop_addr[n−1:0];

⑥ performing, by the XOR encryption circuit, the bitwise XOR operation on the pop return address pop_addr[n−1:0] and the n-bit binary key K to generate an encrypted pop return address, and marking the encrypted pop return address as xor_pop_addr;

⑦ generating, by the MD5 algorithm signature circuit, the pop address signature value by using the encrypted pop return address xor_pop_addr as an input of the MD5 algorithm signature circuit, marking the pop address signature value as pop_signature, and storing the pop address signature value pop_signature in the pop signature register; and ⑧ inputting the push address signature value push_signature and the pop address signature value pop_signature to the signature comparator to be compared; if the push address signature value push_signature is identical with the pop address signature value pop_signature, outputting 1 by the signature comparator, and continuing to execute the routine by the data processor; or if the push address signature value push_signature is not identical with the pop address signature value pop_signature, outputting 0 by the signature comparator, and resetting the data processor.

2. The detection method of control flow attacks based on return address signatures according to claim 1, wherein the pseudo random number generator comprises n D flip-flops and n−1 two-input XOR gates, wherein each D flip-flop has an input terminal, a clock terminal and an output terminal, and each two-input XOR gate has a first input terminal, a second input terminal and an output terminal; the clock terminals of the n D flip-flops are connected at a clock terminal of the pseudo random number generator, and a clock signal is provided to the clock terminal of the pseudo random number generator; the output terminal of the $m^{th}$ D flip-flop is connected to the second input terminal of the $m^{th}$ two-input XOR gate, and the output terminal of the $m^{th}$ two-input XOR gate is connected to the input terminal of the $(m+1)^{th}$ D flip-flop, wherein m=1, 2, . . . , n−1; first-bit data of an n-bit binary random number is provided to the input terminal of the first D flip-flop, and $j^{th}$-bit data of the n-bit binary random number is provided to the first input terminal of the $(j−1)^{th}$ two-input XOR gate, wherein j=2, 3, . . . , n; the output terminal of the $n^{th}$ D flip-flop outputs the n-bit key K; and the n-bit binary random number is generated by a random function.

3. The detection method of control flow attacks based on return address signatures according to claim 2, wherein the XOR encryption circuit comprises n two-input XOR gates, wherein each two-input XOR gate has two input terminals and an output terminal, wherein when the bitwise XOR operation is performed on the push return address push_addr[n−1:0] and the n-bit binary key K by the XOR encryption circuit, $h^{th}$-bit data of push_addr[n−1:0] and $h^{th}$-bit data of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data of the primarily-encrypted pop return address xor_pop_addr, wherein when the bitwise XOR operation is performed on the n-bit return address pop_addr[n−1:0] and the n-bit binary key K by the XOR encryption circuit, $h^{th}$-bit data of the n-bit return address pop_addr[n−1:0] and $h^{th}$-bit data of the n-bit binary key K are respectively provided to the two input terminals of the $h^{th}$ two-input XOR gate in the XOR encryption circuit, an XOR logic value output by the output terminal of the $h^{th}$ two-input XOR gate in the XOR encryption circuit is $h^{th}$-bit data of the secondarily-encrypted pop return address xor_pop_addr, wherein h=1, 2, . . . n.

4. The detection method of control flow attacks based on return address signatures according to claim 3, wherein each two-input XOR gate in the XOR encryption circuit comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein an operation voltage (power supply) VDD is provided to a source of the first PMOS transistor, a source of the second PMOS transistor, a source of the third PMOS transistor and a source of the fourth PMOS transistor; a gate of the first PMOS transistor, a gate of the first NMOS transistor, a gate of the third PMOS transistor and a gate of the third NMOS transistor are connected at a first input terminal of the two-input XOR gate; a drain of the first PMOS transistor, a drain of the first NMOS transistor, the gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth NMOS transistor and a gate of the fifth NMOS transistor are connected at a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected at the output terminal of the two-input XOR gate; a source of the first NMOS transistor, a source of the second NMOS transistor, a source of the fifth NMOS transistor and a source of the sixth NMOS transistor are grounded (i.e. provided with a ground voltage VSS); a source of the third NMOS transistor and a drain of the fifth NMOS transistor are connected; and a source of the fourth NMOS transistor and a drain of the sixth NMOS transistor are connected.

* * * * *